(12) United States Patent
Wu et al.

(10) Patent No.: US 10,009,283 B2
(45) Date of Patent: Jun. 26, 2018

(54) METHOD AND DEVICE FOR PROCESSING INFORMATION

(71) Applicant: Xiaomi Inc., Beijing (CN)

(72) Inventors: Xiaoyong Wu, Beijing (CN); Jie Liu, Beijing (CN); Wei Wang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days. days.

(21) Appl. No.: 15/366,072

(22) Filed: Dec. 1, 2016

(65) Prior Publication Data

US 2017/0163550 A1    Jun. 8, 2017

(30) Foreign Application Priority Data

Dec. 4, 2015  (CN) .......................... 2015 1 0886330

(51) Int. Cl.
| | |
|---|---|
| *H04L 12/863* | (2013.01) |
| *H04L 12/58* | (2006.01) |
| *H04W 24/08* | (2009.01) |
| *H04H 20/42* | (2008.01) |
| *H04W 72/04* | (2009.01) |

(52) U.S. Cl.
CPC .......... *H04L 47/6215* (2013.01); *H04L 51/14* (2013.01); *H04L 51/36* (2013.01); *H04W 24/08* (2013.01); *H04H 20/423* (2013.01); *H04W 72/0473* (2013.01)

(58) Field of Classification Search
CPC ..... H04L 47/6215; H04L 51/14; H04L 51/36; H04W 24/08; H04W 72/0473; H04H 20/423
See application file for complete search history.

(56) References Cited

U.S. PATENT DOCUMENTS 6,785,262 B1 *  8/2004  Yao ........................ G10L 19/002
                                                        370/352
7,809,388 B1 * 10/2010  Othmer ............... H04M 1/6505
                                                        455/426.1
2006/0025122 A1  2/2006  Harris et al.
(Continued)

FOREIGN PATENT DOCUMENTS

CN          1989778 A      6/2007
CN        101465817 A      6/2009
(Continued)

OTHER PUBLICATIONS

International Search Report of PCT/CN2016/092822, mailed from the State Intellectual Property Office of China dated Oct. 26, 2016.
(Continued)

*Primary Examiner* — Nathan Mitchell
(74) *Attorney, Agent, or Firm* — Finnegan, Henderson, Farabow, Garrett & Dunner LLP

(57) ABSTRACT

The present disclosure relates to a method and device for processing information. The method includes: determining a current network state during instant messaging between the first device and a second device; when it is determined that the current network state is abnormal, caching first voice data received from a user of the first device; and when it is determined that the current network state becomes normal, sending the first voice data to the second device.

15 Claims, 14 Drawing Sheets

(56) References Cited

U.S. PATENT DOCUMENTS

| | | | |
|---|---|---|---|
| 2006/0075039 A1* | 4/2006 | Narayanaswami | G06Q 10/107 709/206 |
| 2006/0262767 A1* | 11/2006 | Peleg | H04W 16/28 370/338 |
| 2006/0265454 A1 | 11/2006 | Forlenza et al. | |
| 2007/0097957 A1* | 5/2007 | Cao | H04L 47/10 370/352 |
| 2012/0079065 A1* | 3/2012 | Miyamoto | H04L 12/287 709/217 |
| 2013/0012170 A1 | 1/2013 | Othmer et al. | |
| 2013/0290492 A1* | 10/2013 | ElArabawy | H04L 65/80 709/219 |
| 2014/0372623 A1* | 12/2014 | Chen | H04L 47/30 709/231 |
| 2015/0067105 A1* | 3/2015 | Zhu | H04L 65/60 709/219 |
| 2015/0079999 A1* | 3/2015 | Toker | H04L 47/2491 455/445 |
| 2015/0256988 A1 | 9/2015 | Wen et al. | |

FOREIGN PATENT DOCUMENTS

| | | |
|---|---|---|
| CN | 102685209 A | 9/2012 |
| CN | 103095550 A | 5/2013 |
| CN | 104009960 A | 8/2014 |
| CN | 105376144 A | 3/2016 |
| JP | 2008-508795 | 3/2008 |
| KR | 10-2006-0059040 | 6/2006 |
| KR | 10-0654137 | 12/2006 |
| KR | 10-2007-0029275 | 3/2007 |
| RU | 2513761 C2 | 4/2014 |

OTHER PUBLICATIONS

English version of International Search Report of PCT/CN2016/092822, mailed from the State Intellectual Property Office of China dated Oct. 26, 2016.

European Search Report Issued in European Application No. 16199595.6, mailed from the European Patent Office, dated Apr. 12, 2017.

Russian Office Action issued in Russian Patent Application No. 2016145261/08 (072692), dated Mar. 6, 2018.

* cited by examiner

METHOD AND DEVICE FOR PROCESSING INFORMATION

CROSS-REFERENCE TO RELATED APPLICATIONS

The present application is based upon and claims priority to Chinese Patent Application No. 201510886330.X, filed Dec. 4, 2015, the entire contents of which are incorporated herein by reference.

TECHNICAL FIELD

The present disclosure generally relates to the field of communication technology and, more particularly, to a method and a device for processing information.

BACKGROUND

With the popularity of smart phones, in addition to making voice calls through regular phone functions, people also use their smart phones to send and receive voice messages through instant messaging tools, such as WeChat™, QQ™, Skype™ Instant Messenger, Facebook™ Messenger, or the like. This flexibility in exchanging voice information has brought great convenience to daily communication. However, when a smart phone has a bad reception of signals, such as in an environment with poor cellular and/or wireless signals, transmission of voice data may be adversely affected.

SUMMARY

According to a first aspect of the present disclosure, there is provided an information processing method for use in a first device, comprising: determining a current network state during instant messaging between the first device and a second device; when it is determined that the current network state is abnormal, caching first voice data received from a user of the first device; and when it is determined that the current network state becomes normal, sending the first voice data to the second device.

According to a second aspect of the present disclosure, there is provided a first device for processing information, comprising: a processor; and a memory for storing instructions executable by the processor; wherein the processor is configured to: determine a current network state during instant messaging between the first device and a second device; when it is determined that the current network state is abnormal, cache first voice data received from a user of the first device; and when it is determined that the current network state becomes normal, send the first voice data to the second device.

According to a third aspect of the present disclosure, there is provided a non-transitory computer-readable storage medium comprising instructions that, when executed by a processor of a first device for processing information, cause the first device to perform a method comprising: determining a current network state during instant messaging between the first device and a second device; when it is determined that the current network state is abnormal, caching first voice data received from a user of the first device; and when it is determined that the current network state becomes normal, sending the first voice data to the second device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated into and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
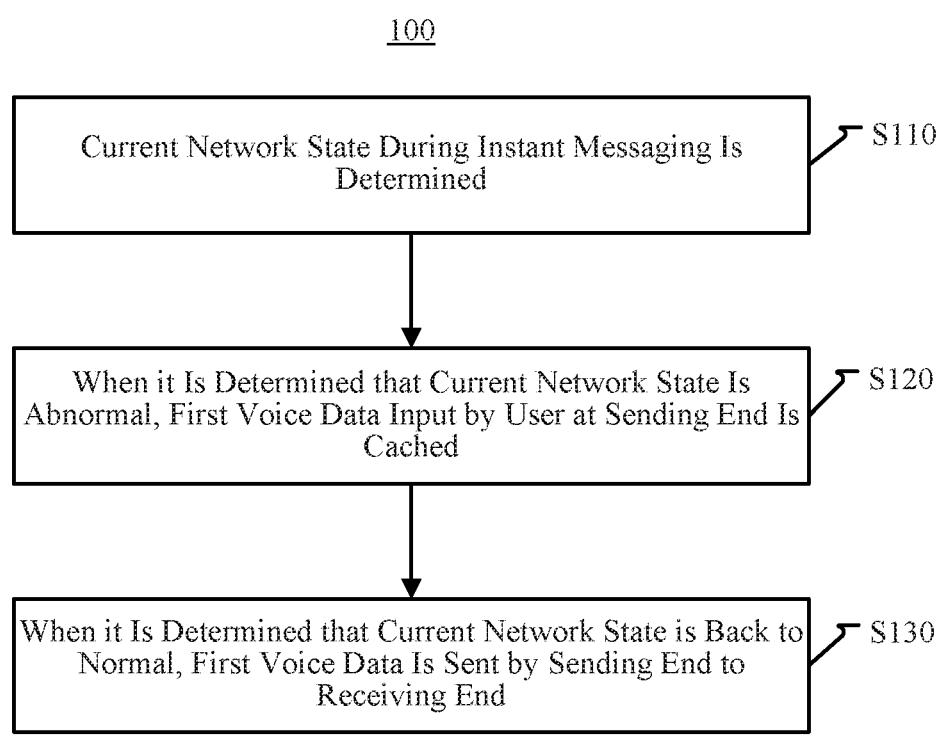
FIG. 1 is a flowchart of a method for processing information, according to an exemplary embodiment.

FIG. 1 is a flowchart of a method 100 for processing information, according to an exemplary embodiment. For example, the method 100 may be applied in a sending end of voice data. The sending end may be a device with instant messaging functions. For example, the sending end may be a mobile phone, a computer, a digital broadcast terminal, a messaging device, a gaming console, a tablet, a medical device, exercise equipment, a personal digital assistant, and the like. As shown in FIG. 1, the method 100 includes the following steps S110-S130.

In step S110, a current network state during instant messaging is determined.

In step S120, when it is determined that the current network state is abnormal, first voice data input by a user at the sending end is cached.

In step S130, when it is determined that the current network state is back to normal, the first voice data is sent by the sending end to a receiving end. The receiving end is also a device with instant messaging functions.

In some embodiments, the sending end may also perform step S130 by sending the first voice data to the receiving end in a pause period of the instant messaging. The pause period is a period of time in which no other voice data is transmitted between the sending end and the receiving end.

According to the method 100, voice data input at the sending end can be cached when the current network condition is abnormal, and be sent to the receiving end when the current network condition is back to normal. As such, the method 100 can prevent the loss of voice data due to bad network conditions. In particular, when contents of the instant messaging are very important, the method 100 can prevent the important information from being lost during the instant messaging, and thus can improve the user experience with instant messaging.

Figure 2:
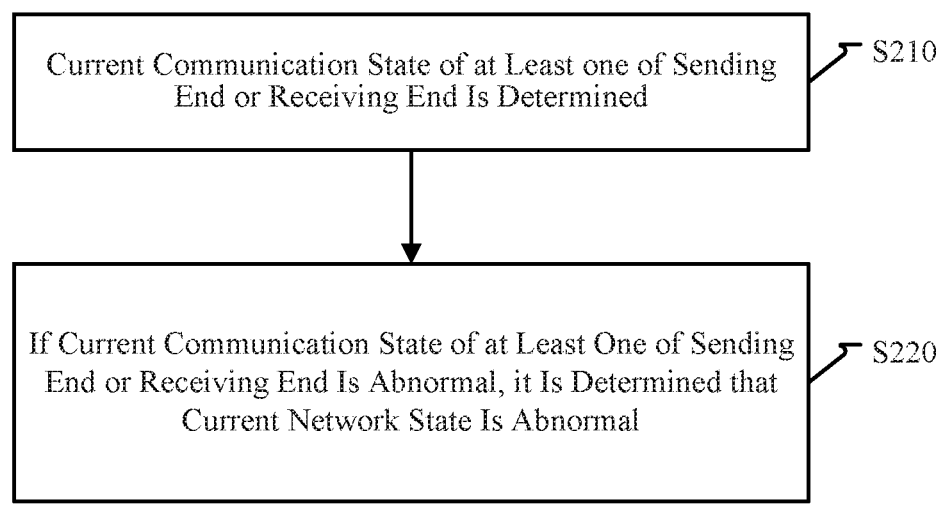
FIG. 2 is a flowchart of step S110 in the method shown in FIG. 1, according to an exemplary embodiment.

FIG. 2 is a flowchart of step S110 shown in FIG. 1, according to an exemplary embodiment. Referring to FIG. 2, step S110 may further include the following steps S210 and S220.

In step S210, a current communication state of at least one of the sending end or the receiving end is determined.

Figure 3:
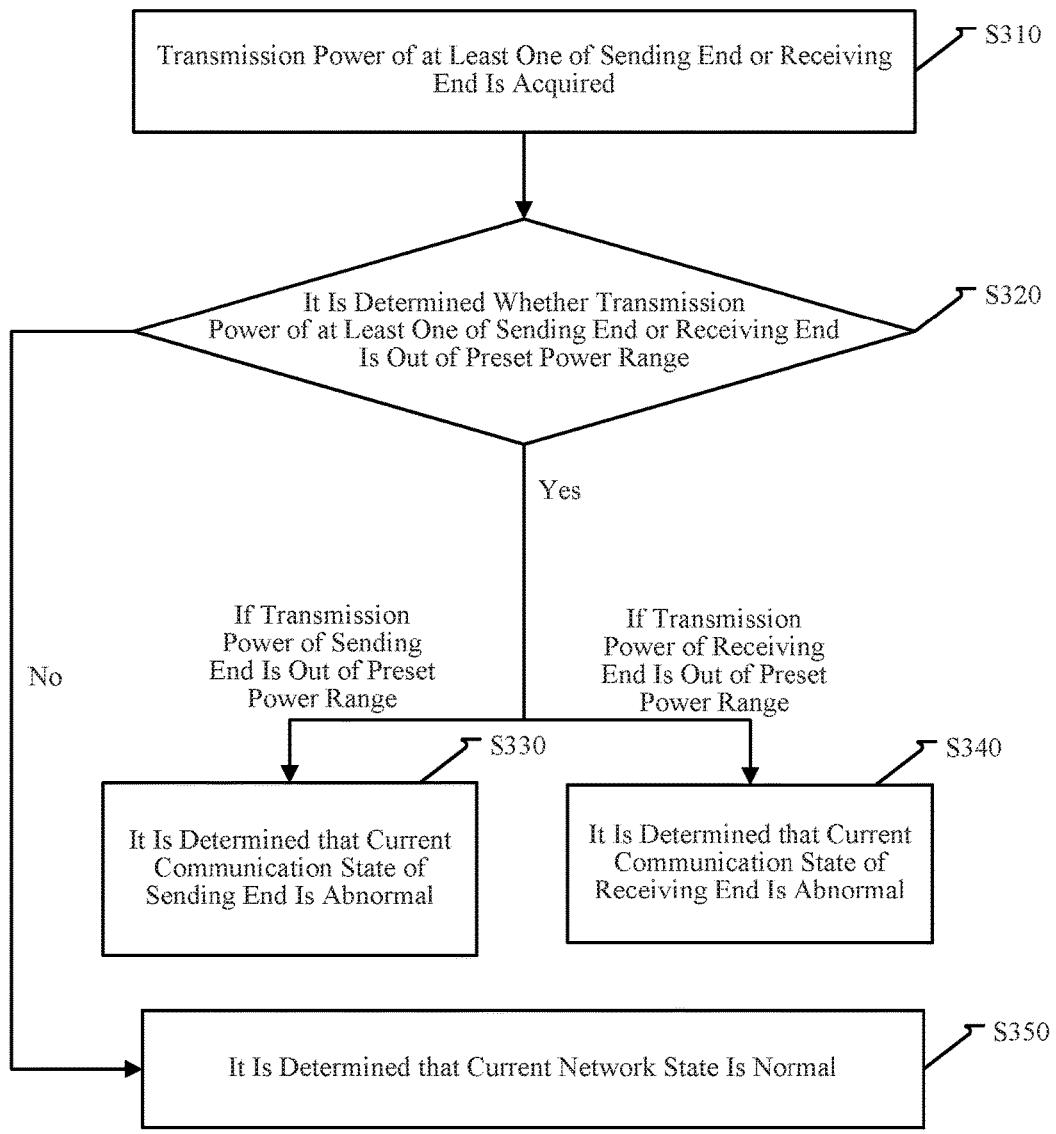
FIG. 3 is a flowchart of step S210 in the method shown in FIG. 2, according to an exemplary embodiment.

The communication state determined in step 210 may include the signal strengths at the receiving end and/or the sending end. The signal strength may be measured by transmission powers of the sending end and/or receiving end. FIG. 3 is a flowchart of step 210 shown in FIG. 2, according to an exemplary embodiment. Referring to FIG. 3, step S210 may further include steps S310-S350.

In step S310, transmission power of at least one of the sending end or the receiving end is acquired.

In some embodiments, the receiving end can determine the transmission power of the receiving end itself, and report the determined transmission power to the sending end, such that the sending end can determine whether the communication state of the receiving end is abnormal. Alternatively, the receiving end can determine the current communication state of the receiving end based on its transmission power, and send the transmission power to the sending end when the current communication state of the receiving end is abnormal.

In step S320, it is determined whether the transmission power of at least one of the sending end or the receiving end is out of a preset power range. If the transmission power of the sending end is out of the preset power range, step S330 is performed. If the transmission power of the receiving end is out of the preset power range, step S340 is performed. Moreover, if transmission powers of both the sending end and the receiving end are within the preset power range, step S350 is performed.

In step S330, it is determined that the current communication state of the sending end is abnormal.

In step S340, it is determined that the current communication state of the receiving end is abnormal.

In step S350, it is determined that the current network state is normal.

For example, the preset power range may be −65 dBm~−97 dBm (i.e., decibel milliwatt). Accordingly, if the transmission powers of both the sending end and the receiving end are within −65 dBm~−97 dBm, it is determined that the current network state is normal. In contrast, if the transmission power of at least one of the sending end or receiving end is out of −65 dBm~−97 dBm, it is determined that the current network state is abnormal.

In step S220, if the current communication state of at least one of the sending end or the receiving end is abnormal, it is determined that the current network state is abnormal. That is, only when the current communication states of both the sending end and the receiving end of the instant messaging are normal, it is determined that the current network state is normal.

Consistent with the embodiment described in connection with FIG. 2, the current network state is considered normal only when the current communication states of both the sending end and the receiving end are normal. As such, if the current communication state of at least one of the sending end or the receiving end is abnormal, it is determined that the current network state is abnormal, and the voice data received from the user of the sending end is fully cached before being sent to the receiving end. This way, loss of voice data due to a bad network state during the instant messaging can be avoided.

Figure 4:
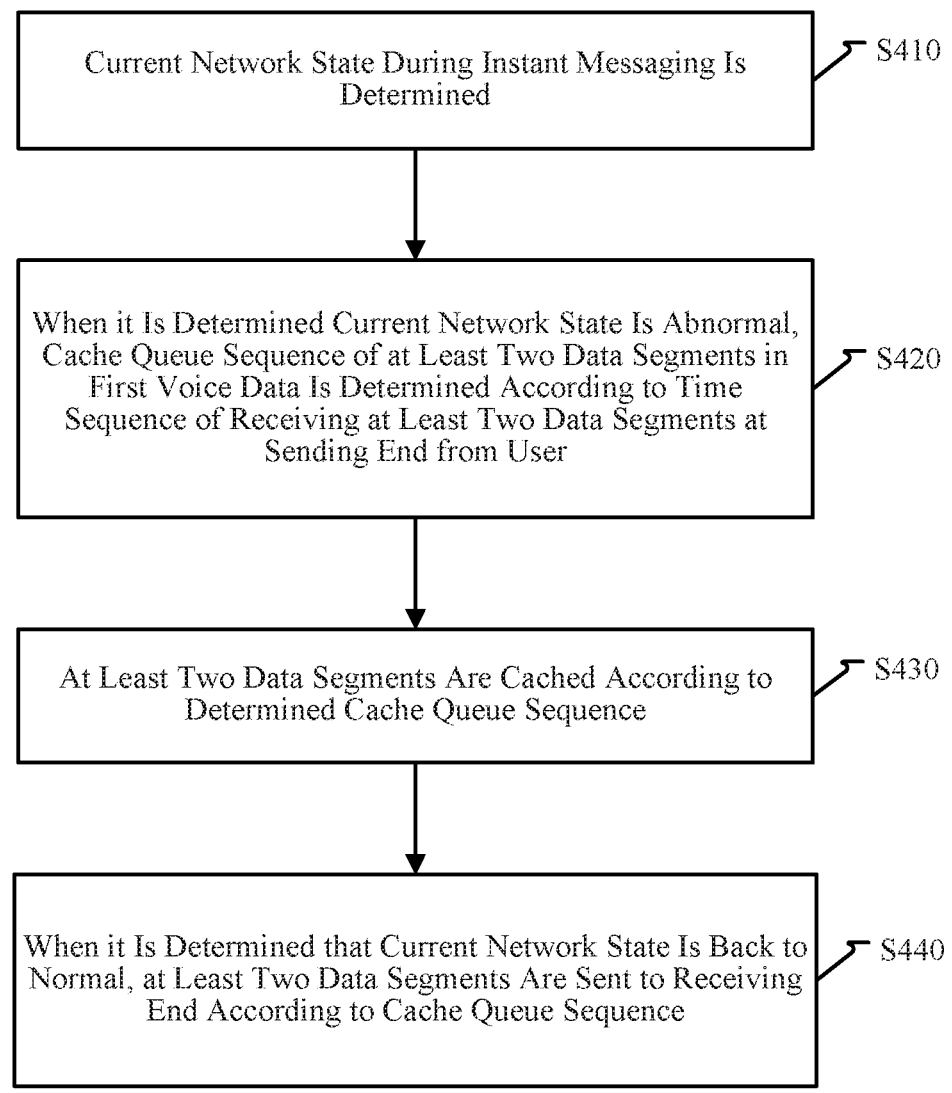
FIG. 4 is a flowchart of a method for processing information, according to another exemplary embodiment.

In some embodiments, the first voice data may include at least two data segments. Each data segment may correspond to a distinct sentence, phrase, word, etc. FIG. 4 is a flowchart of a method 400 for processing information, according to another exemplary embodiment. As described below, the method 400 may be used in a situation where the voice data transmitted during instant messaging includes at least two data segments. Referring to FIG. 4, the method 400 includes steps S410-S440.

In step S410, a current network state during instant messaging is determined.

In step S420, when it is determined that the current network state is abnormal, a cache queue sequence of at least two data segments in first voice data is determined according to a time sequence of receiving the at least two data segments at the sending end from a user.

In step S430, the at least two data segments are cached according to the determined cache queue sequence.

In step S440, when it is determined that the current network state is back to normal, the at least two data segments are sent to the receiving end according to the cache queue sequence.

According to the method 400, a cache queue sequence of a plurality of data segments in the first voice data can be determined according to the time sequence of receiving the plurality of data segments at the sending end from a user, and the plurality of data segments are cached and sent according to the cache queue sequence. This way, the time sequence for the receiving end to receive the plurality of data segments matches the time sequence of the user of the sending end to input the plurality of data segments into the sending end. Thus, the method 400 can ensure the cached voice data to be transmitted according to the order in which the user enters the voice data, and improve the user experience during instant messaging.

Figure 5:
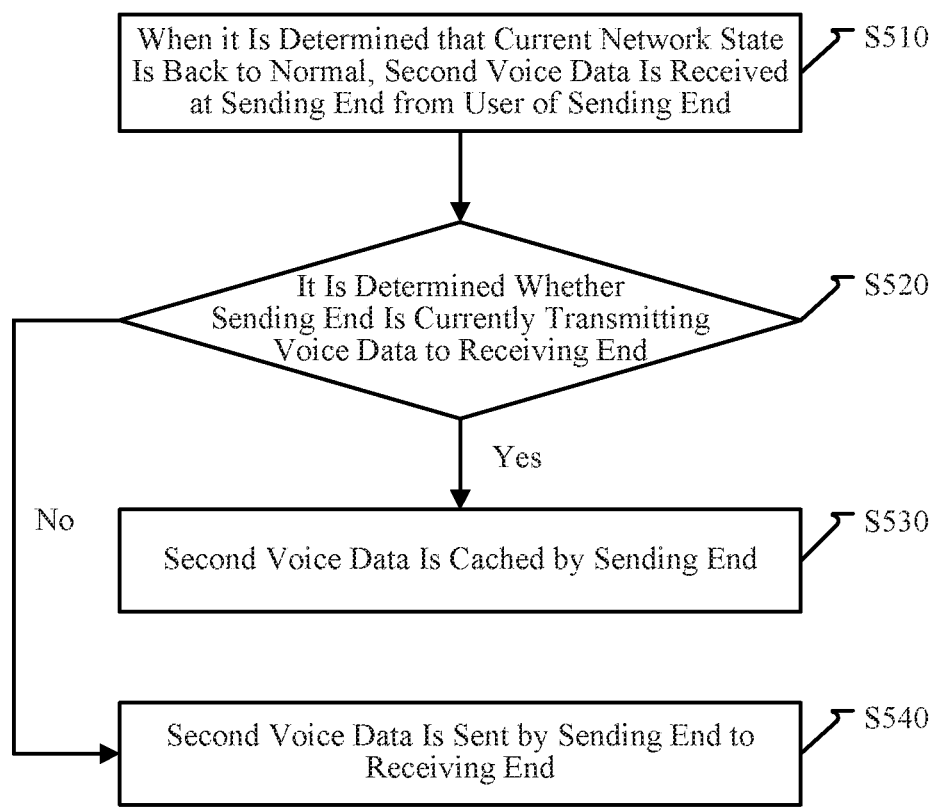
FIG. 5 is a flowchart of a method for processing information, according to another exemplary embodiment.

FIG. 5 is a flowchart of a method 500 for processing information, according to another exemplary embodiment. Consistent with the disclosed embodiments, the method 500 may be performed in conjunction with the method 100 (FIG. 1) or method 400 (FIG. 4). For example, the method 500 may be used after step 130 or step 440 is performed. Referring to FIG. 5, the method 500 includes steps S510-S540.

In step S510, when it is determined that the current network state is back to normal, second voice data is received at the sending end from the user of the sending end.

In step S520, it is determined whether the sending end is currently transmitting voice data to the receiving end. When it is determined that the sending end is currently transmitting voice data to the receiving end, step S530 is performed. When it is determined that the sending end currently does not transmit voice data to the receiving end, step S540 is performed.

In step S530, the second voice data is cached by the sending end.

In step S540, the second voice data is sent by the sending end to the receiving end.

In the present embodiment, the voice data currently being transmitted by the sending end to the receiving end may be the first voice data or previously received data segments in the second voice data. For example, consistent with the methods 100 and 400, the first voice data input by a user of the sending end is cached by the sending end when it is determined that the current communication state of the receiving end or the sending end is abnormal, and is sent by the sending end to the receiving end when it is determined that the current network state is back to normal. While sending the first voice data, if the sending end continues to receive the second voice data, the second voice data can be cached and then sent after the transmission of the first voice data is completed. As another example, the second voice data may include multiple data segments. While sending earlier received data segments of the second voice data to the receiving end, if the sending end continues to receive other data segments of the second voice data input by the user, the sending end can cache the later received data segments, and send the cached data segments to the receiving end after the transmission of the earlier received data segments of the second voice data is completed.

According to the method 500, the sending end first caches the second voice data received after the current network state is back to normal, and then transmits the cached second voice data to the receiving end after the current transmission of voice data is completed. As such, the method 500 can ensure the sequence of the voice data received at the receiving end matches the sequence of the voice data being received at the sending end from the user. This way, disorder of the voice data during transmission can be avoided, and the user experience during the instant messaging can be improved.

Consistent with methods 400 and 500, the second voice data received at the sending end after the current network state is back to normal may include at least two data segments. Accordingly, step S530 may be implemented as the following: a cache queue sequence of the at least two data segments in the second voice data is determined according to a time sequence of receiving the at least two data segments of the second voice data; and the at least two data segments of the second voice data are cached according to the cache queue sequence. Correspondingly, step S540 may also be implemented as the following: the at least two data segments of the second voice data are sent to the receiving end according to the cache queue sequence.

Figure 6:
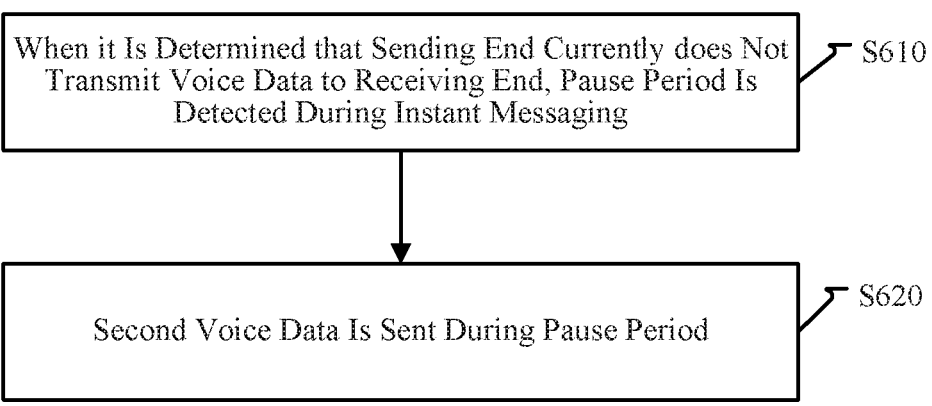
FIG. 6 is a flowchart of step S540 in the method shown in FIG. 5, according to an exemplary embodiment.

FIG. 6 is a flowchart of step S540 shown in FIG. 5, according to an exemplary embodiment. Referring to FIG. 6, step S540 may further include the following steps S610 and S620.

In step S610, when it is determined that the sending end currently does not transmit voice data to the receiving end, a pause period is detected during the instant messaging. The pause period is a period of time in which the sending end neither sends voice data to nor receives voice data from other devices, e.g., the receiving end.

In step S620, the second voice data is sent during the pause period.

In the disclosed embodiments, by using the pause period to send the voice data whose transmission is delayed due to abnormal network state, the pace of transmitting the voice data gradually catches up with the actual speaking speed of the user. Thus, the user experience during the instant messaging can be improved.

Furthermore, when the pause period is detected, if the voice data cached in the sending end includes both the first voice data and the second voice data, both the first and second voice data can be sent to the receiving end during the pause period. This way, all the voice data whose transmission is delayed by the abnormal network state can be sent within the same time window.

In the disclosed embodiments, the above-described methods may further include the following steps A1 and/or step A2.

In step A1, when it is determined that the current communication state of the sending end is abnormal, a first notification message is sent by the sending end to the receiving end. The first notification message is used to notify the receiving end that the current communication state of the sending end is abnormal and the transmission of the voice data is delayed.

In some embodiments, the first notification message may be broadcast by the receiving end as a voice message. For example, the receiving end may broadcast, in the form of voice, the following first notification message: "transmission of voice data may be delayed due to bad signal at the other end of this conversation."

In step A2, when it is determined that the current communication state of the receiving end is abnormal, a second notification message is sent by the receiving end to the sending end. The second notification message is configured to notify the sending end that the current communication state of the receiving end is abnormal and the transmission of voice data is delayed.

Similar to the first notification message, the second notification message may be broadcast by the sending end as a voice message. For example, the sending end may broadcast, in the form of voice, the following second notification message: "transmission of voice data may be delayed due to bad signal at the other end of this conversation."

The above-described first and second notification messages can be sent respectively when the current communication state of the receiving end or the sending end is abnormal. This way, users at the receiving end and/or the sending end can be informed about the current network state in real time. As such, the user experience during the instant messaging is improved.

Figure 7:
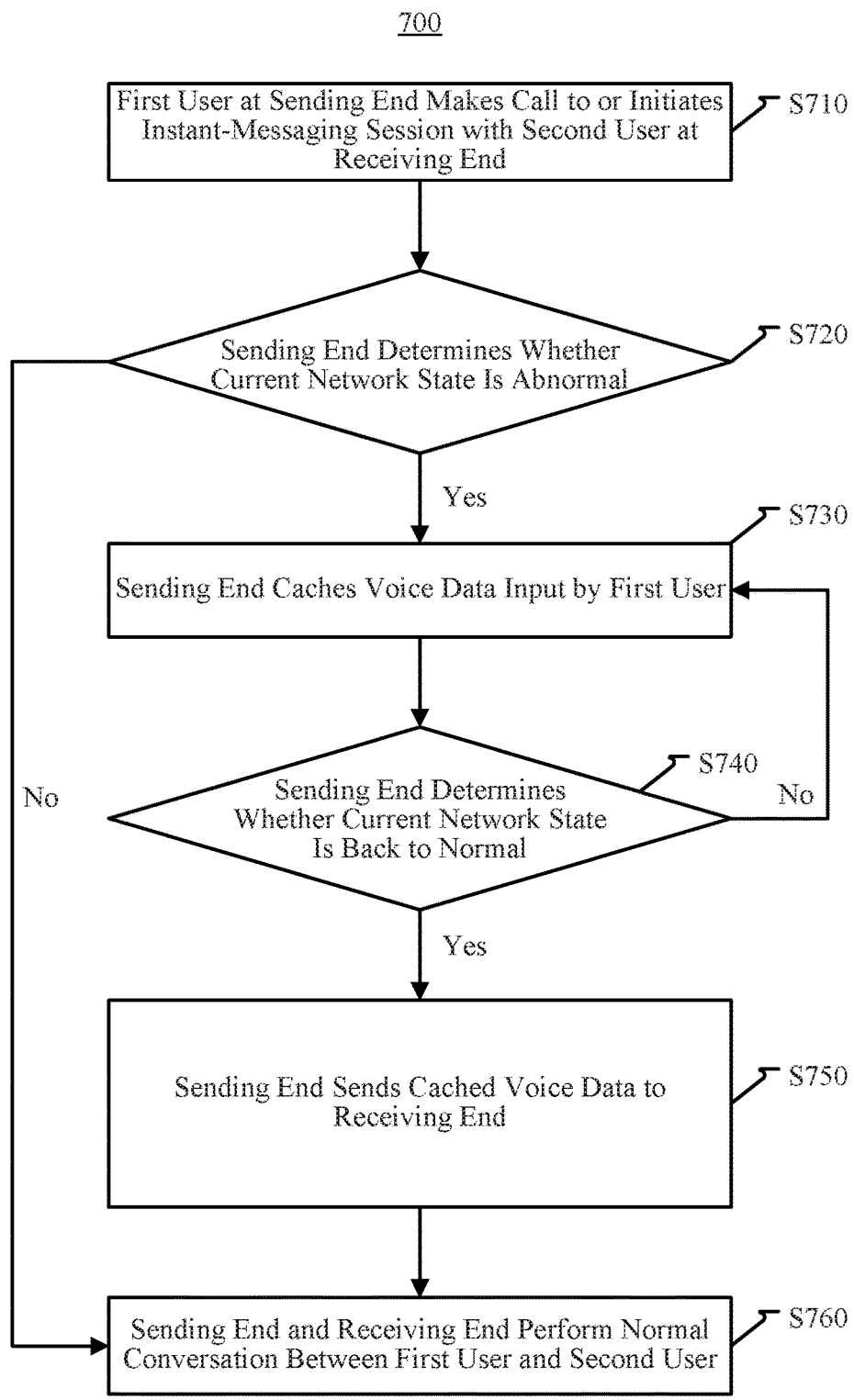
FIG. 7 is a flowchart of a method for processing information, according to another exemplary embodiment.

Next, an implementation of the disclosed methods for processing information will be described in connection with FIG. 7. FIG. 7 is a flowchart of a method 700 for processing information, according to another exemplary embodiment. As shown in FIG. 7, the method 700 may be applied in a sending end of instant messages, and may include the following steps S710-S760.

In step S710, a first user at the sending end makes a call to or initiates an instant-messaging session with a second user at a receiving end.

In step S720, the sending end determines whether the current network state is abnormal. When the current network state is abnormal, step S730 is performed. When the current network state is normal, step S760 is performed.

In step S730, the sending end caches voice data input by the first user.

In step S740, the sending end determines whether the current network state is back to normal. When the current network state is back to normal, step S750 is performed. When the current network state remains abnormal, step S730 is repeated.

In step S750, the sending end sends the cached voice data to the receiving end. Additionally or alternatively, the sending end detects a pause period of the conversation between the first and second users, and sends the cached voice data to the receiving end during the pause period.

In step S760, the sending end and the receiving end perform a normal conversation between the first user and the second user.

The following description relates to device embodiments of the present disclosure, which may be used to perform the method embodiments of the present disclosure.

Figure 8:
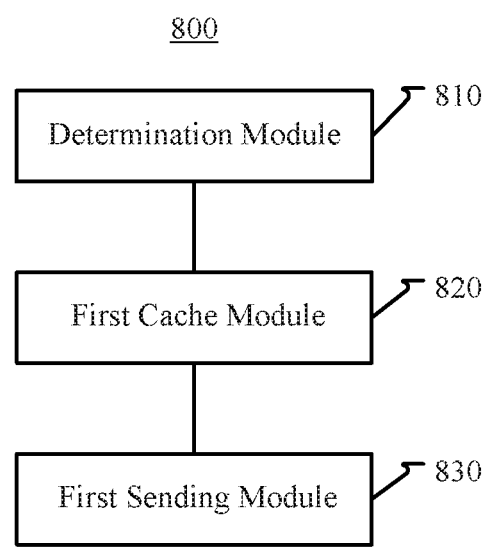
FIG. 8 is a block diagram of a device for processing information, according to an exemplary embodiment.

FIG. 8 is a block diagram of a device 800 for processing information, according to an exemplary embodiment. The functions of device 800 may be realized by software, hardware, or a combination thereof. The device 800 may be a part or the whole of an electronic apparatus. Referring to FIG. 8, the device 800 includes a determination module 810, a first cache module 820, and a first sending module 830.

Consistent with the disclosed embodiments, the determination module 810 is configured to determine a current network state during instant messaging.

The first cache module 820 is configured to cache first voice data input by a user, when it is determined by the determination module 810 that the current network state is abnormal.

The first sending module 830 is configured to send the first voice data, cached by the first cache module 820, to a second device, when it is determined by the determination module 810 that the current network state is back to normal.

In some embodiments, the first sending module 830 may also be configured to send the first voice data to the second device in a pause period during the instant messaging. The pause period is a period of time in which no other voice data is sent or received by the device 800.

Figure 9:
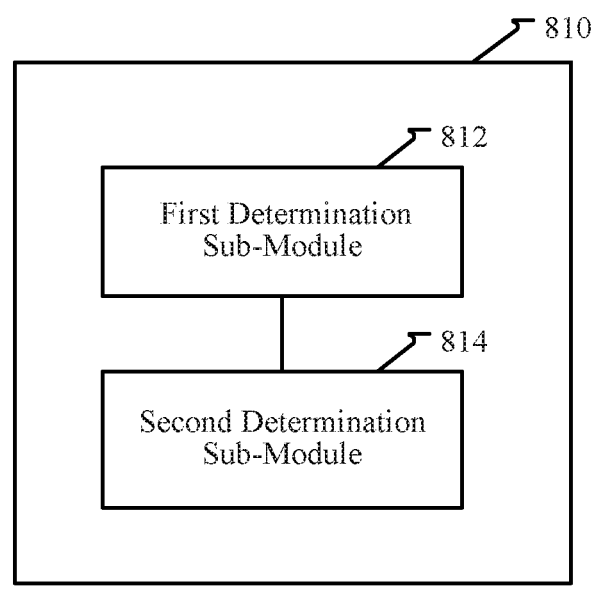
FIG. 9 is a block diagram of a determination module in a device for processing information, according to an exemplary embodiment.

FIG. 9 is a block diagram of the determination module 810 shown in FIG. 8, according to an exemplary embodiment. Referring to FIG. 9, the determination module 810 further includes a first determination sub-module 812 and a second determination sub-module 814.

The first determination sub-module 812 is configured to determine the current communication state of at least one of the device 800 or the second device.

The second determination sub-module 814 is configured to determine that the current network state is abnormal, when it is determined by the first determination sub-module 812 that the current communication state of at least one of the device 800 or the second device is abnormal. Moreover, when the current communication states of both the device 800 and the second device are normal, the determination module 810 determines that the current network state is normal.

In one embodiment, the first determination sub-module 812 is further configured to: acquire transmission power of at least one of the device 800 or the second device; determine whether the transmission power of the device 800 or the second device is out of a preset power range; if the transmission power of the device 800 is out of the preset power range, determine that the current communication state of the device 800 is abnormal; and if the transmission power of the second device is out of the preset power range, determine that the current communication state of the second device is abnormal.

In some embodiments, the second device can constantly detect the transmission power of the second device itself and report the detected transmission power to the first determination sub-module 812. Alternatively, the second device can determine the current communication state of the second device according to its transmission power, and report the transmission power of the second device to the first determination sub-module 812 when the current communication state of the second device is abnormal.

For example, the preset power range may be −65 dBm~−97 dBm. When the transmission power of the device 800 or the second device is within −65 dBm~−97 dBm, the first determination sub-module 812 determines that the current communication state of the device 800 or the second device is normal. Conversely, if the transmission power of the device 800 or the second device is out of −65 dBm~−97 dBm, the first determination sub-module 812 determines that the current communication state of the device 800 or the second device is abnormal.

Figure 10:
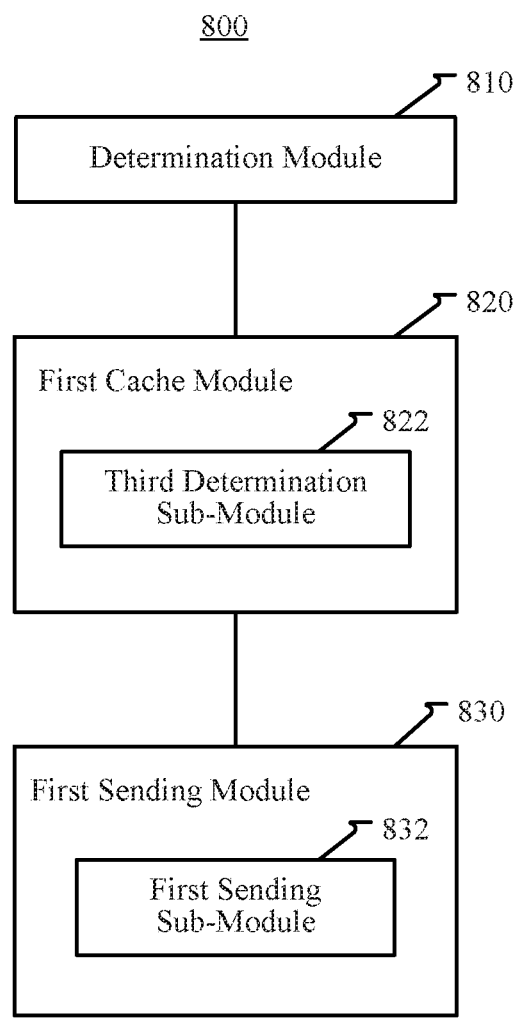
FIG. 10 is a block diagram of a device for processing information, according to another exemplary embodiment.

FIG. 10 is a block diagram of the device 800 shown in FIG. 8, according to another exemplary embodiment. Referring to FIG. 10, the first cache module 820 further includes a third determination sub-module 822 and the first sending module 830 further includes a first sending sub-module 832.

The third determination sub-module 822 is configured to, when the first voice data includes at least two data segments, determine a cache queue sequence of the at least two data segments according to a time sequence of receiving the at least two data segments by the device 800; and cache the at least two data segments according to the cache queue sequence.

The first sending sub-module 832 is configured to send the at least two data segments to the second device according to the cache queue sequence determined by the third determination sub-module 822.

Figure 11:
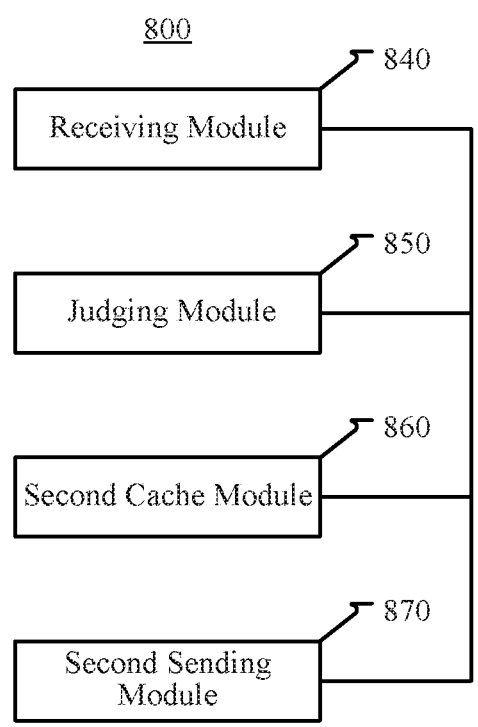
FIG. 11 is a block diagram of a device for processing information, according to another exemplary embodiment.

FIG. 11 is a block diagram of the device 800 for processing information, according to another exemplary embodiment. Referring to FIG. 11, in addition to the determination module 810, the first cache module 820, and the first sending module 830 (not shown in FIG. 11), the device 800 further includes a receiving module 840, a judging module 850, a second cache module 860, and a second sending module 870.

The receiving module 840 is configured to receive second voice data.

The judging module 850 is configured to determine whether the device 800 is currently transmitting voice data to the second device, when the receiving module 840 receives the second voice data.

The second cache module 860 is configured to cache the second voice data, when the judging module 850 determines that the device 800 is currently transmitting voice data to the second device.

The second sending module 870 is configured to send the second voice data to the second device, when the judging module 850 determines that the device 800 currently does not transmit voice data to the second device.

In the disclosed embodiments, the voice data currently transmitted by the device 800 may be the first voice data or previously received data segments of the second voice data. For example, if it is determined that the current network state is abnormal, the first voice data input by the user can be cached by the device 800. If it is determined that the current network state is back to normal, the device 800 can send the cached first voice data to the second device. While sending the first voice data, if the receiving module 840 continues to receive the second voice data input by the user, the second cache module 860 caches the second voice data, and the second sending module 870 sends the cached second voice data to the second device after transmission of the first voice data is completed. As another example, the second data voice data may include multiple data segments. While sending earlier received data segments of the second voice data to the second device, if the receiving module 840 continues to receive other data segments of the second voice data input by the user, the second cache module 860 caches the later received data segments, and the second sending module 870 sends the cached data segments to the second device after transmission of the earlier received data segments of the second voice data is completed.

In one embodiment, when the second voice data received by the receiving module 840 includes at least two data segments, the second cache module 860 is further configured to determine a cache queue sequence of the at least two data segments in the second voice data according to a time sequence of receiving the at least two data segments; and cache the at least two data segments according to the cache queue sequence. Correspondingly, the second sending module 870 is further configured to send the at least two data segments in the second voice data to the second device according to the cache queue sequence, when it is determined that the current network state is back to normal.

Figure 12:
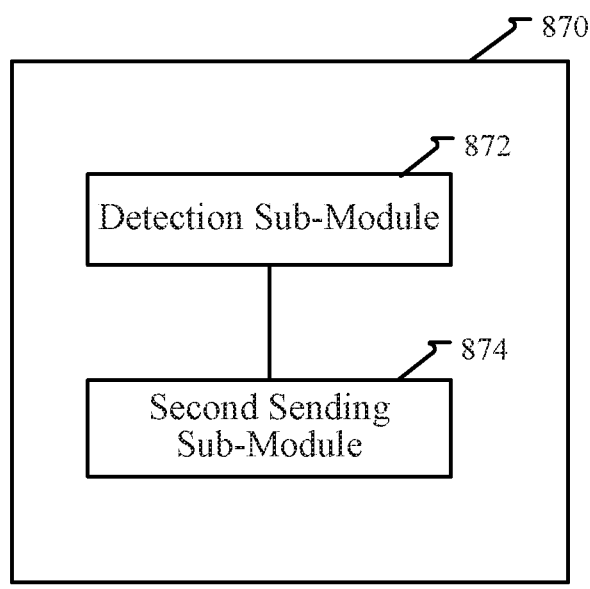
FIG. 12 is a block diagram of a second sending module in a device for processing information, according to an exemplary embodiment.

FIG. 12 is a block diagram of the second sending module 870 shown in FIG. 11, according to an exemplary embodiment. Referring to FIG. 12, the second sending module 870 further includes a detection sub-module 872 and a second sending sub-module 874.

The detection sub-module 872 is configured to, when the judging module 850 determines that the device 800 currently does not transmit voice data to the second device, detect a pause period during the instant messaging. The pause period is a period of time in which no voice data is sent or received by the device 800.

The second sending sub-module 874 is configured to send the cached second voice data to the second device during the pause period.

Figure 13:
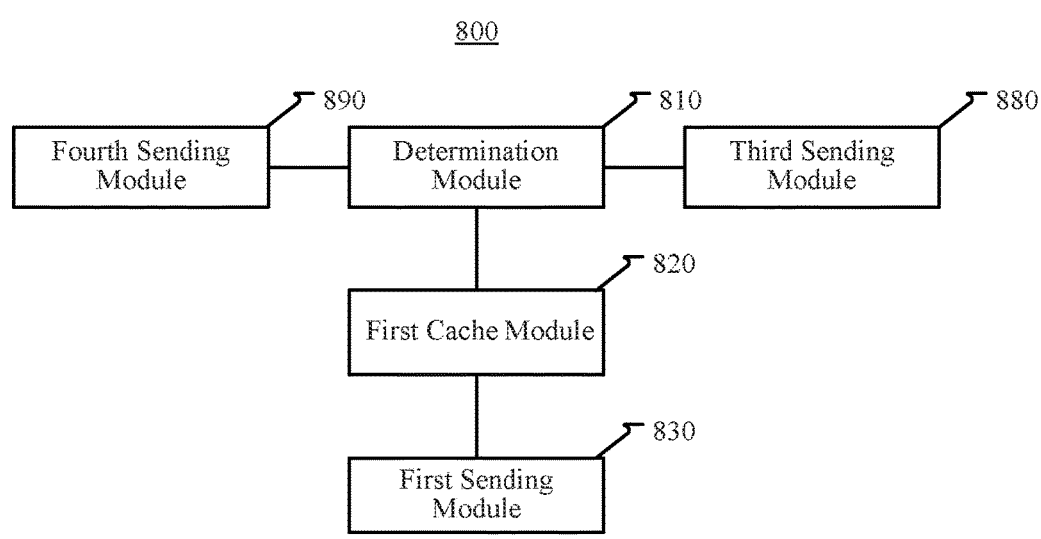
FIG. 13 is a block diagram of a device for processing information, according to another exemplary embodiment.

FIG. 13 is a block diagram of the device 800 for processing information, according to another exemplary embodiment. Referring to FIG. 13, in addition to the determination module 810, the first cache module 820, and the first sending module 830, the device 800 further includes a third sending module 880 or a fourth sending module 890.

When the device 800 serves as a sending end of voice data and the second device serve as a receiving end of the voice data, the device 800 may include the third sending module 880. The third sending module 880 is configured to send a first notification message to the second device (i.e., the receiving end) when the determination module 810 determines that the current communication state of the device 800 is abnormal. The first notification message is configured to notify the second device (i.e., the receiving end) that the current communication state of the device 800 (i.e., the sending end) is abnormal and the transmission of voice data is delayed.

When the device 800 serves as a receiving end of voice data and the second device serve as a sending end of the voice data, the device 800 may include the fourth sending module 890. The fourth sending module 890 is configured to send a second notification message to the second device (i.e. the sending end) when the determination module 810 determines that the current communication state of the device 800 is abnormal. The second notification message is used to notify the second device (i.e., the sending end) that the current communication state of the device 800 (i.e., the receiving end) is abnormal and the transmission of voice data is delayed.

Consistent with the above description, the device 800 may only include one of the third sending module 880 and the fourth sending module 890.

In some embodiments, the first notification message and/or the second notification message are broadcast by the second device in the form of a voice message.

Figure 14:
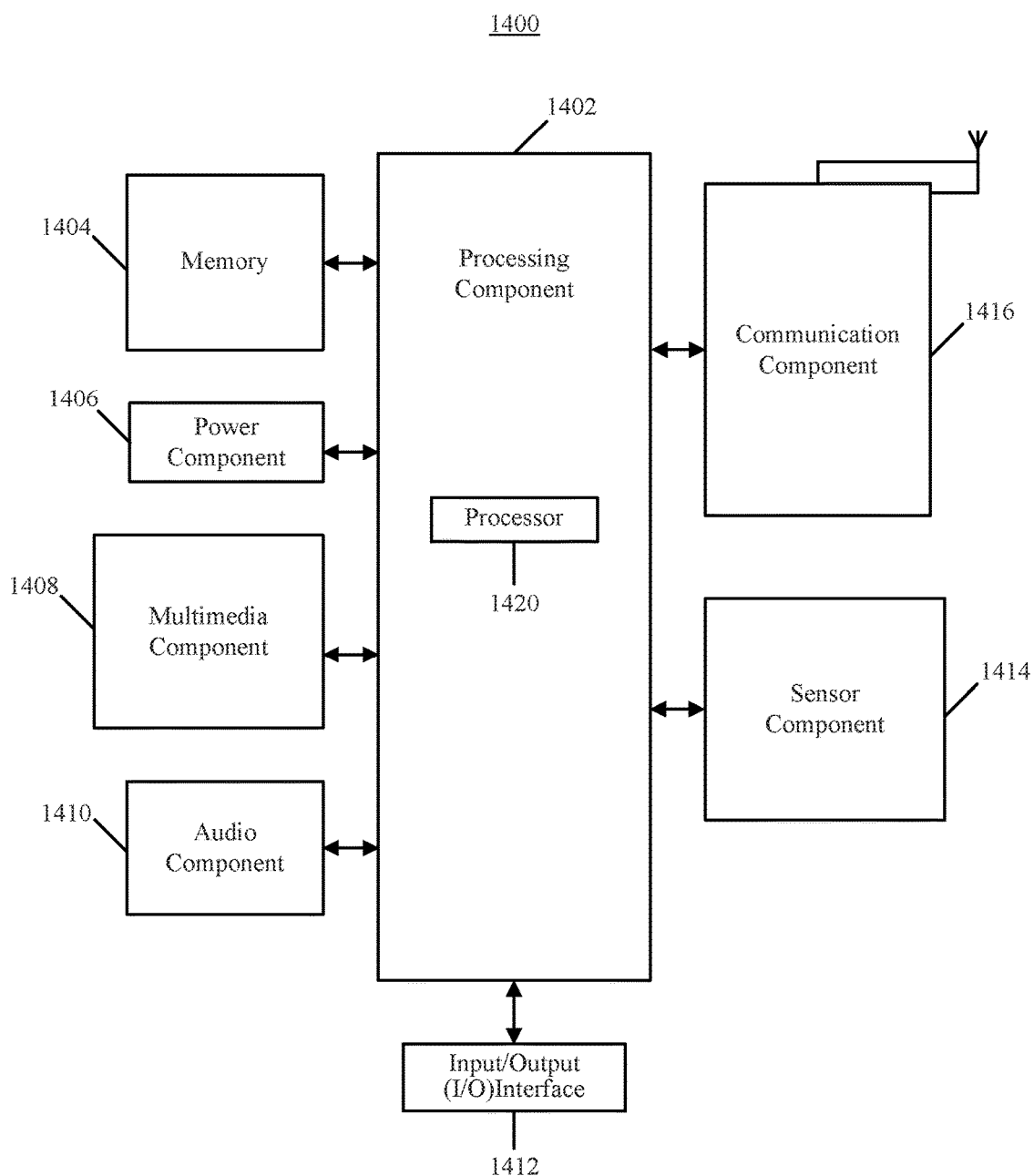
FIG. 14 is a block diagram of a device for processing information, according to another exemplary embodiment.

FIG. 14 is a block diagram of a device 1400 for processing information, according to an exemplary embodiment. For example, the device 1400 may be a mobile phone, a computer, a digital broadcast terminal, a messaging device, a gaming console, a tablet, a medical device, exercise equipment, a personal digital assistant, and the like. Consistent with the disclosed embodiments, the device 1400 may be a terminal operating as a sending end or receiving end of voice data during instant messaging.

The device 1400 may include one or more of the following components: a processing component 1402, a memory 1404, a power component 1406, a multimedia component 1408, an audio component 1410, an input/output (I/O) interface 1412, a sensor component 1414, and a communication component 1416.

The processing component 1402 typically controls overall operations of the device 1400, such as the operations associated with display, telephone calls, data communications, camera operations, and recording operations. The processing component 1402 may include one or more processors 1420 to execute instructions to perform all or part of the steps in the above described methods. Moreover, the processing component 1402 may include one or more modules which facilitate the interaction between the processing component 1402 and other components. For instance, the processing component 1402 may include a multimedia module to facilitate the interaction between the multimedia component 1408 and the processing component 1402.

The memory 1404 is configured to store various types of data to support the operation of the device 1400. Examples of such data include instructions for any applications or methods operated on the device 1400, contact data, phonebook data, messages, pictures, video, etc. The memory 1404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the device 1400. The power component 1406 may include a power management system, one or more power sources, and any other components associated with the generation, management, and distribution of power in the device 1400.

The multimedia component 1408 includes a screen providing an output interface between the device 1400 and the user. In some embodiments, the screen may include a liquid crystal display and a touch panel. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1408 includes a front camera and/or a rear camera. The front camera and the rear camera may receive external multimedia data while the device 1400 is in an operation mode, such as a photographing mode or a video mode. Each of the front camera and the rear camera may be a fixed optical lens system or have focus and optical zoom capability.

The audio component 1410 is configured to output and/or input audio signals. For example, the audio component 1410 includes a microphone configured to receive an external audio signal when the device 1400 is in an operation mode, such as a call mode, a recording mode, and a voice recognition mode. The received audio signal may be further stored in the memory 1404 or transmitted via the communication component 1416. In some embodiments, the audio component 1410 further includes a speaker to output audio signals.

The I/O interface 1412 provides an interface between the processing component 1402 and peripheral interface modules, such as a keyboard, a click wheel, buttons, and the like. The buttons may include, but are not limited to, a home button, a volume button, a starting button, and a locking button.

The sensor component 1414 includes one or more sensors to provide status assessments of various aspects of the device 1400. For instance, the sensor component 1414 may detect an open/closed status of the device 1400, relative positioning of components, e.g., the display and the keypad, of the device 1400, a change in position of the device 1400 or a component of the device 1400, a presence or absence of user contact with the device 1400, an orientation or an acceleration/deceleration of the device 1400, and a change in temperature of the device 1400. The sensor component 1414 may include a proximity sensor configured to detect the presence of nearby objects without any physical contact. The sensor component 1414 may also include a light sensor, such as a CMOS or CCD image sensor, for use in imaging applications. In some embodiments, the sensor component 1414 may also include an accelerometer sensor, a gyroscope sensor, a magnetic sensor, a pressure sensor, or a temperature sensor.

The communication component 1416 is configured to facilitate communication, wired or wirelessly, between the device 1400 and other devices. The device 1400 can access a wireless network based on a communication standard, such as WiFi, 2G, 3G, 4G, or a combination thereof. In one exemplary embodiment, the communication component 1416 receives a broadcast signal or broadcast associated information from an external broadcast management system via a broadcast channel In one exemplary embodiment, the communication component 1416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1404, executable by the processor 1420 in the device 1400, for performing the above-described methods for processing information. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. An information processing method for use in a first device, comprising:
   determining a current network state during instant messaging between the first device and a second device;
   when it is determined that the current network state is abnormal, caching first voice data received from a user of the first device; and
   when it is determined that the current network state becomes normal,
      sending the first voice data to the second device;
      receiving second voice data from the user of the first device;
      determining whether the first device is currently transmitting other voice data to the second device;
      when it is determined that the first device is currently transmitting other voice data to the second device, caching the second voice data; and
      when it is determined that the first device currently does not transmit other voice data to the second device, sending the second voice data to the second device.

2. The method of claim 1, wherein the determining of the current network state comprises:
   determining a current communication state of at least one of the first device or the second device; and
   when the current communication state of the at least one of the first device or the second device is abnormal, determining that the current network state is abnormal.

3. The method of claim 2, wherein the determining of the current communication state of the at least one of the first device or the second device comprises:
   acquiring transmission power of the at least one of the first device or the second device;
   determining whether the transmission power is out of a preset power range; and
   when the transmission power is out of the preset power range, determining that the current communication state of the at least one of the first device or the second device is abnormal.

4. The method of claim 1, wherein:
the first voice data includes at least two data segments;
the caching of the first voice data further comprises:
- determining a cache queue sequence of the at least two data segments according to a time sequence of receiving the at least two data segments by the first device; and
- caching the at least two data segments according to the cache queue sequence; and the sending of the first voice data to the second device further comprises:
- sending the at least two data segments to the second device according to the cache queue sequence.

5. The method of claim 1, further comprising:
when it is determined that the first device currently does not transmit other voice data to the second device, detecting a pause period of the instant messaging, the pause period being a period of time in which no other voice data is sent or received by the first device; and
sending the cached second voice data to the second device during the pause period.

6. The method of claim 2, further comprising:
when it is determined that the current communication state of the first device is abnormal, sending a first notification message to the second device, the first notification message being configured to notify the second device that the current communication state of the first device is abnormal and transmission of the first voice data is delayed; and
when it is determined that the current communication state of the second device is abnormal, receiving a second notification message from the second device, the second notification message indicating that the current operating state of the second device is abnormal and the transmission of the voice data is delayed.

7. The method of claim 6, further comprising:
receiving the second notification message as a broadcast message.

8. A first device for processing information, comprising:
a processor; and
a memory for storing instructions executable by the processor;
wherein the processor is configured to:
- determine a current network state during instant messaging between the first device and a second device;
- when it is determined that the current network state is abnormal, cache first voice data received from a user of the first device; and
- when it is determined that the current network state becomes normal,
  - send the first voice data to the second device;
  - receive second voice data from the user of the first device;
  - determine whether the first device is currently transmitting other voice data to the second device;
  - when it is determined that the first device is currently transmitting other voice data to the second device, cache the second voice data; and
  - when it is determined that the first device currently does not transmit other voice data to the second device, send the second voice data to the second device.

9. The first device of claim 8, wherein the processor is further configured to:
determine a current communication state of at least one of the first device or the second device; and
when the current communication state of the at least one of the first device or the second device is abnormal, determine that the current network state is abnormal.

10. The first device of claim 9, wherein the processor is further configured to:
acquire transmission power of the at least one of the first device or the second device;
determine whether the transmission power is out of a preset power range; and
when the transmission power is out of the preset power range, determine that the current communication state of the at least one of the first device or the second device is abnormal.

11. The first device of claim 8, wherein:
the first voice data includes at least two data segments; and
the processor is further configured to:
- determine a cache queue sequence of the at least two data segments according to a time sequence of receiving the at least two data segments by the first device;
- cache the at least two data segments according to the cache queue sequence; and
- send the at least two data segments to the second device according to the cache queue sequence.

12. The first device of claim 8, wherein the processor is further configured to:
when it is determined that the first device currently does not transmit other voice data to the second device, detect a pause period of the instant messaging, the pause period being a period of time in which no other voice data is sent or received by the first device; and
send the cached second voice data to the second device during the pause period.

13. The first device of claim 9, wherein the processor is further configured to:
when it is determined that the current communication state of the first device is abnormal, send a first notification message to the second device, the first notification message being configured to notify the second device that the current communication state of the first device is abnormal and transmission of the first voice data is delayed; and
when it is determined that the current communication state of the second device is abnormal, receive a second notification message from the second device, the second notification message indicating that the current operating state of the second device is abnormal and the transmission of the voice data is delayed.

14. The device of claim 13, wherein the processor is further configured to:
receive the second notification message as a broadcast message.

15. A non-transitory computer-readable storage medium comprising instructions that, when executed by a processor of a first device for processing information, cause the first device to perform a method comprising:
determining a current network state during instant messaging between the first device and a second device;
when it is determined that the current network state is abnormal, caching first voice data received from a user of the first device; and
when it is determined that the current network state becomes normal,
sending the first voice data to the second device;
receiving second voice data from the user of the first device;

determining whether the first device is currently transmitting other voice data to the second device;

when it is determined that the first device is currently transmitting other voice data to the second device, caching the second voice data; and when it is determined that the first device currently does not transmit other voice data to the second device, sending the second voice data to the second device.

* * * * *